UNITED STATES PATENT OFFICE.

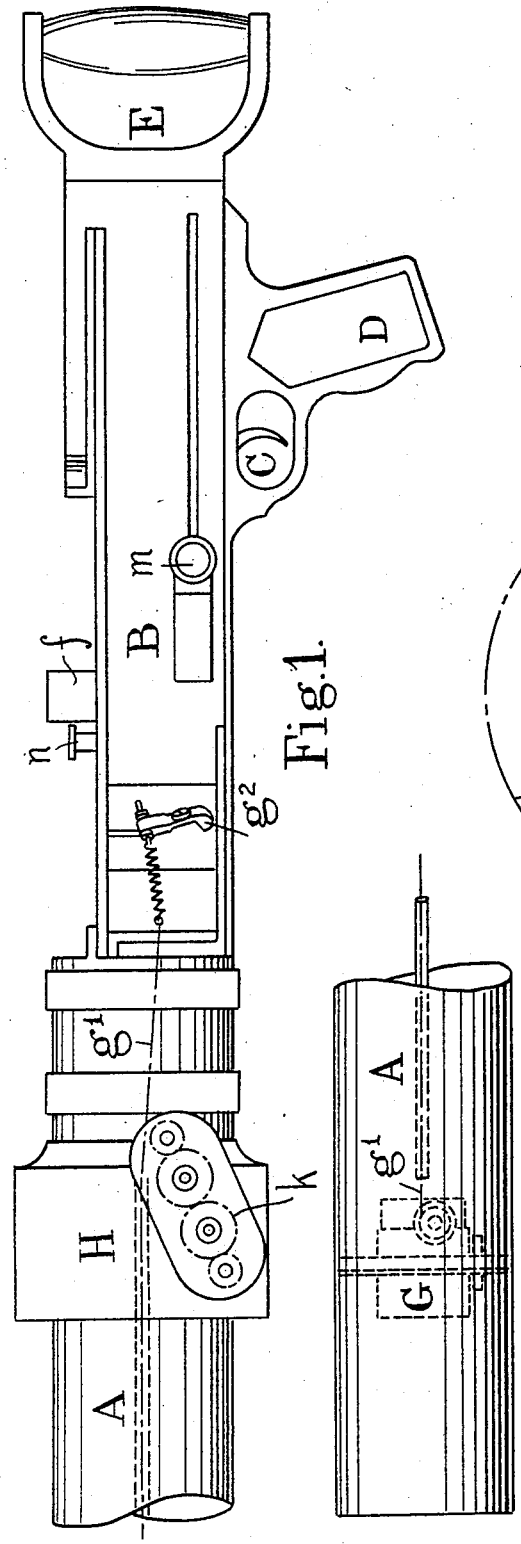
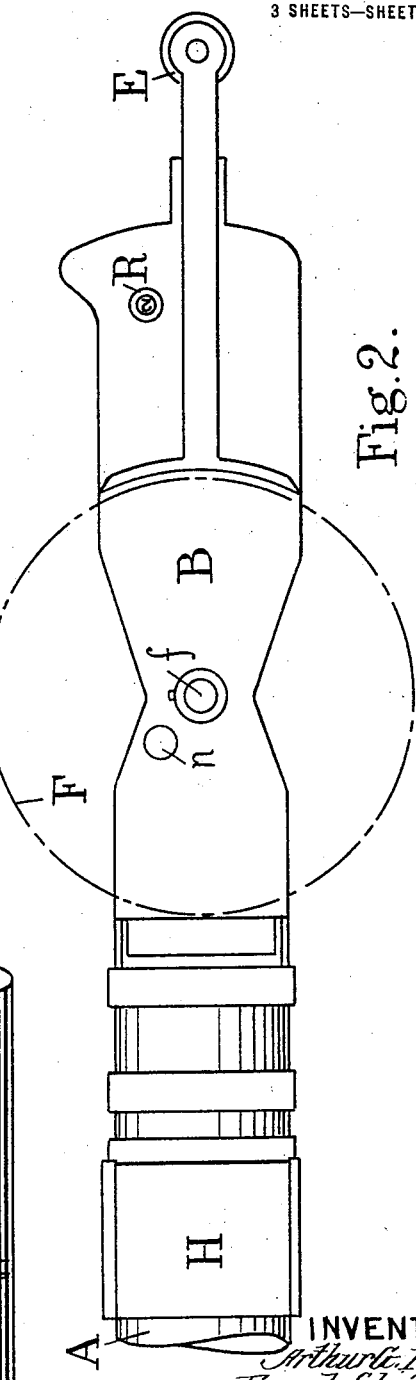

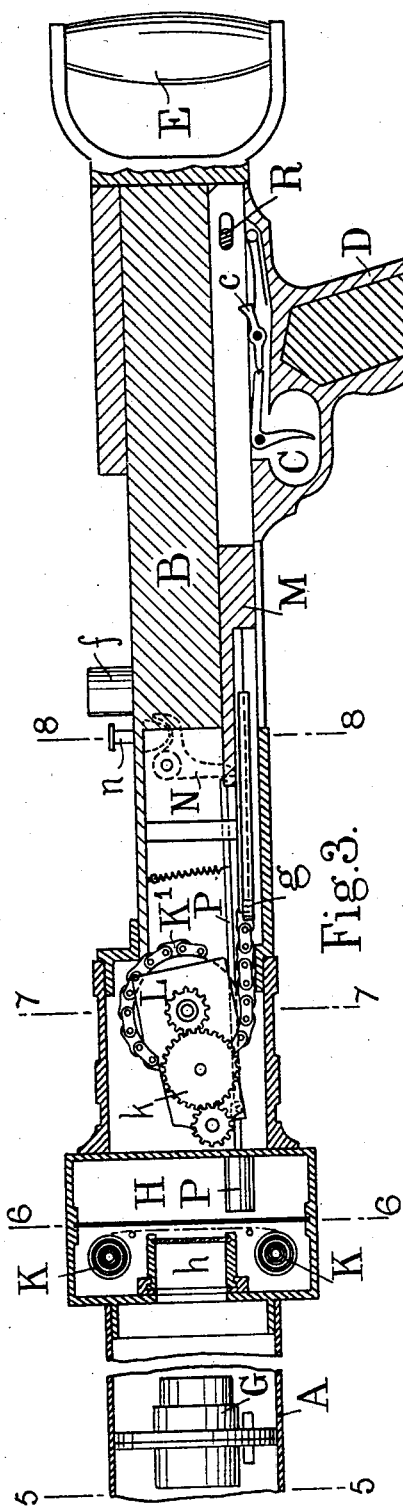
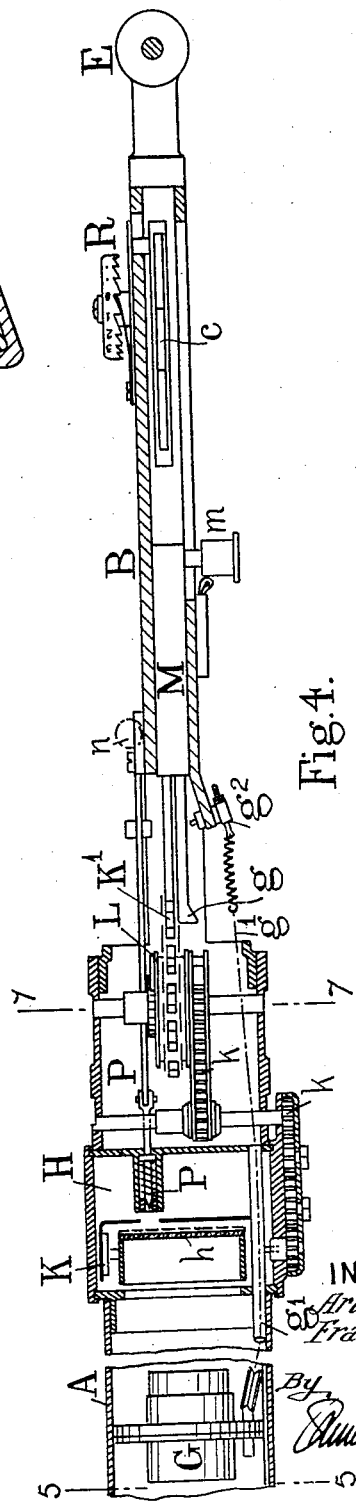

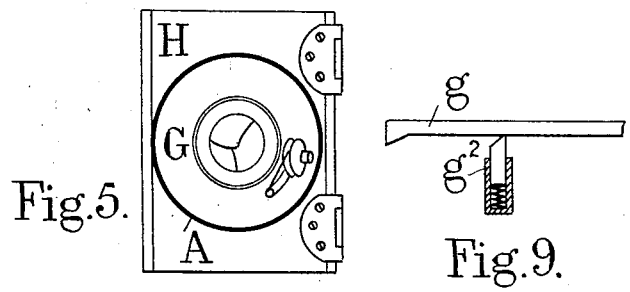
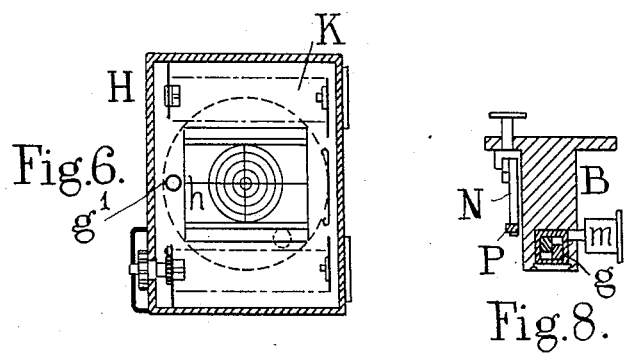
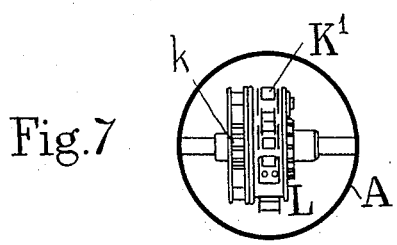

ARTHUR GRAY PICKARD AND FRANK SLINGER, OF ALTRINCHAM, ENGLAND, ASSIGNORS TO THORNTON-PICKARD MANUFACTURING COMPANY LIMITED, OF ALTRINCHAM, CHESTER, ENGLAND.

PHOTOGRAPHIC CAMERA.

1,395,869.    Specification of Letters Patent.    Patented Nov. 1, 1921.

Application filed July 16, 1918. Serial No. 245,180.

*To all whom it may concern:*

Be it known that we, ARTHUR GRAY PICKARD and FRANK SLINGER, both British subjects, residing both at Altrincham, county of Chester, England, have invented certain new and useful Improvements in Photographic Cameras, of which the following is a specification.

This invention relates to photographic cameras capable of being focused or sighted in the same manner as a gun.

It consists essentially in constructing the camera in appearance or external contour as nearly as practical the same as a machine gun inclosing the operating mechanism with in the same and such as to require all the movements of, or movements similar to, machine gun practice to obtain a satisfactory photograph whereby the use or practice with the camera will be equivalent to gun drill or practice.

In this way photographic shots may be made and pictures taken which will record the accuracy, aim and the result of shooting while at the same time giving practice with the gun.

The invention is primarily intended to represent machine guns of the Lewis type but may be made to represent other types of machine guns.

The invention will be fully described with reference to the accompanying drawings, which as an example show the invention as representing a machine gun of the Lewis type.

Figure 1 is a side elevation of the camera.
Fig. 2 is a plan.
Fig. 3 is a longitudinal section.
Fig. 4 is a sectional plan.
Fig. 5 is a transverse section on line 5—5, Figs. 3 and 4.
Fig. 6 is a transverse section on line 6—6, Fig. 3.
Fig. 7 is a transverse section on line 7—7, Figs. 3 and 4.
Fig. 8 is a transverse section on line 8—8, Fig. 3.
Fig. 9 is a detail plan of arm $g$ for operating the shutter of the lens G.

The camera is constructed externally with a barrel A, a stock B, a trigger C, a trigger handle D, a handle E to oscillate the gun, a part F, representing the ammunition magazine of a firearm and a pillar $f$ to receive the part F, also swivel and sights.

The barrel A forms the optical part of the camera and in it are placed the lenses G with a between lens shutter of iris or other suitable construction. To the rear of the barrel a chamber H of rectangular or other shape is formed to hold the sensitized photographic medium, preferably in the form of a photographic film K with means for winding the film forward after each exposure, and a second chamber with a spring barrel L or other motor mechanism which can be utilized to actuate the changing mechanism for the film and other parts of the apparatus.

A screen $h$ with circles, cross lines or other marking is inserted in the chamber H in front of the film K the markings on which will be reproduced on the photograph to indicate the degree of the accuracy of the shooting.

The spring motor L is connected with the winding spool of the film K by a train of gears $k$ and is wound up by a chain K' around the periphery of the barrel one end of which is attached to a sliding bolt M.

The sliding bolt M with knob or handle $m$ is fitted to one side of the stock B and is moved in one direction by the spring motor L and in the other direction against the force of the spring by hand to take the place of or represent the lever for setting the trigger of the real gun. The spring in the barrel L is wound up as the sliding bolt M is moved backward and at the same time the rotation of the barrel moves forward the film for the next exposure, and the spring in the barrel L serves to move the slide bolt M forward when released by the trigger.

To the slide bolt M an arm $g$ is affixed to open and close the shutter of the lens G at or near the end of its forward traverse. The shutter is connected by a wire or cord $g'$ with a rocking lever $g^2$ placed in the path of the arm $g$ which as it passes strikes the lever and operates the shutter to open and close it.

The slide bolt M is held in its rear position by a catch $c$ engaging a notch therein and is released by a trigger C.

Adjacent to the pillar $f$ for the part F representing the ammunition magazine of a fire-arm, a bell-crank lever N is pivoted with a pin or rod n projecting upward which when the magazine is placed in position is pressed down to rock the lever. The lever N abuts against the end of a rod or striker or punch P which is projected forward to perforate or otherwise mark the film K to indicate thereon that the operation of placing the part representing the ammunition magazine of a fire-arm in position has been fully carried out before pulling the trigger to operate the shutter.

A counter R may be attached to the side of the stock to record the number of times the slide bolt M has been drawn back and the camera operated.

The drawing back of the slide bolt M rotates the spring motor L and winds the film K forward—or changes the plates—and sets the trigger C and the pull of the trigger releases the slide bolt which is drawn back by the spring motor L or other motor at the same time the rod $g$ striking the lever $g^2$ opens the shutter of the lens G to permit the exposure to be taken, the shutter closing again almost instantaneously.

As applied to other machine guns the external contour of the gun will be followed and the internal arrangements will be similar to those above described consistently with the operation of changing the film or plate and making the exposure agreeing with the operations commonly used in manipulating the gun in firing practice, the part representing the ammunition magazine of a fire-arm, such as a disk or drum or a band to represent a cartridge belt, being applied, with a corresponding lever and device to mark or perforate the film.

What we claim as our invention and desire to protect by Letters Patent is:—

1. A photographic camera having an exterior contour similar to that of a machine gun and embodying a receiver for a part representing the magazine of a machine gun, a barrel, a lens and shutter contained in the barrel, a spring motor to operate the film, a slide-bolt to wind the motor and to operate the shutter, a trigger and coöperative catch to hold and release the slide-bolt, and a device operative by the placing of the magazine-representing part on its receiver, to mark the film.

2. In a photographic camera having the general contour of a firearm and adapted to be used for recording operations such as shooting, the combination with a lens, means for supporting a sensitive medium for exposure by the lens, and a receiver for a part representing the magazine of a fire-arm of a device operative automatically to mark or indicate on the sensitive medium when a part representing the ammunition magazine of a firearm has been properly applied to said receiver.

In testimony whereof we have hereunto set our hands in presence of two subscribing witnesses, this 12th day of June, 1918.

ARTHUR GRAY PICKARD.
FRANK SLINGER.

Witnesses:
J. OWDEN O'BRIEN,
HARRY BARNFATHER.